United States Patent
Dang et al.

(10) Patent No.: US 7,313,709 B2
(45) Date of Patent: Dec. 25, 2007

(54) INSTRUCTION SET WITH THERMAL OPCODE FOR HIGH-PERFORMANCE MICROPROCESSOR, MICROPROCESSOR, AND METHOD THEREFOR

(75) Inventors: Hien P. Dang, Nanuet, NY (US); Arun Sharma, New Rochelle, NY (US); Sri M. Sri-Jayantha, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 10/981,473

(22) Filed: Nov. 5, 2004

(65) Prior Publication Data

US 2006/0101289 A1 May 11, 2006

(51) Int. Cl.
*G06F 1/00* (2006.01)
(52) U.S. Cl. ...................................... 713/300
(58) Field of Classification Search ................. 713/300
See application file for complete search history.

(56) References Cited

U.S. PATENT DOCUMENTS

| | | | |
|---|---|---|---|
| 5,557,551 A | | 9/1996 | Craft |
| 5,941,991 A | * | 8/1999 | Kageshima .................. 713/340 |
| 6,397,321 B1 | * | 5/2002 | Yamamoto et al. ........... 712/35 |
| 6,625,740 B1 | * | 9/2003 | Datar et al. .................. 713/324 |
| 2002/0065049 A1 | * | 5/2002 | Chauvel et al. ............... 455/66 |
| 2003/0182589 A1 | * | 9/2003 | Tani ........................... 713/300 |
| 2005/0071701 A1 | * | 3/2005 | Luick .......................... 713/320 |
| 2006/0031815 A1 | * | 2/2006 | Bhagia et al. .............. 717/106 |

OTHER PUBLICATIONS

International Preliminary Report on Patentability (Chapter 1 of the Patent Cooperation Treaty)(PCT Rule 44bis, 1(c)), May 18, 2007, International Application No. PCT/US2005/0338815, The International Bureau of WIPO.

* cited by examiner

*Primary Examiner*—Rehana Perveen
*Assistant Examiner*—Mohammed H Rehman
(74) *Attorney, Agent, or Firm*—Vazken Alexanian; McGinn IP Law Group, PLLC

(57) ABSTRACT

A method (and system) of managing heat in an electrical circuit, includes using a thermal instruction appended to an instruction to be processed to determine a heat load associated with the instruction.

27 Claims, 12 Drawing Sheets

300

400

210

600

800

900

1100

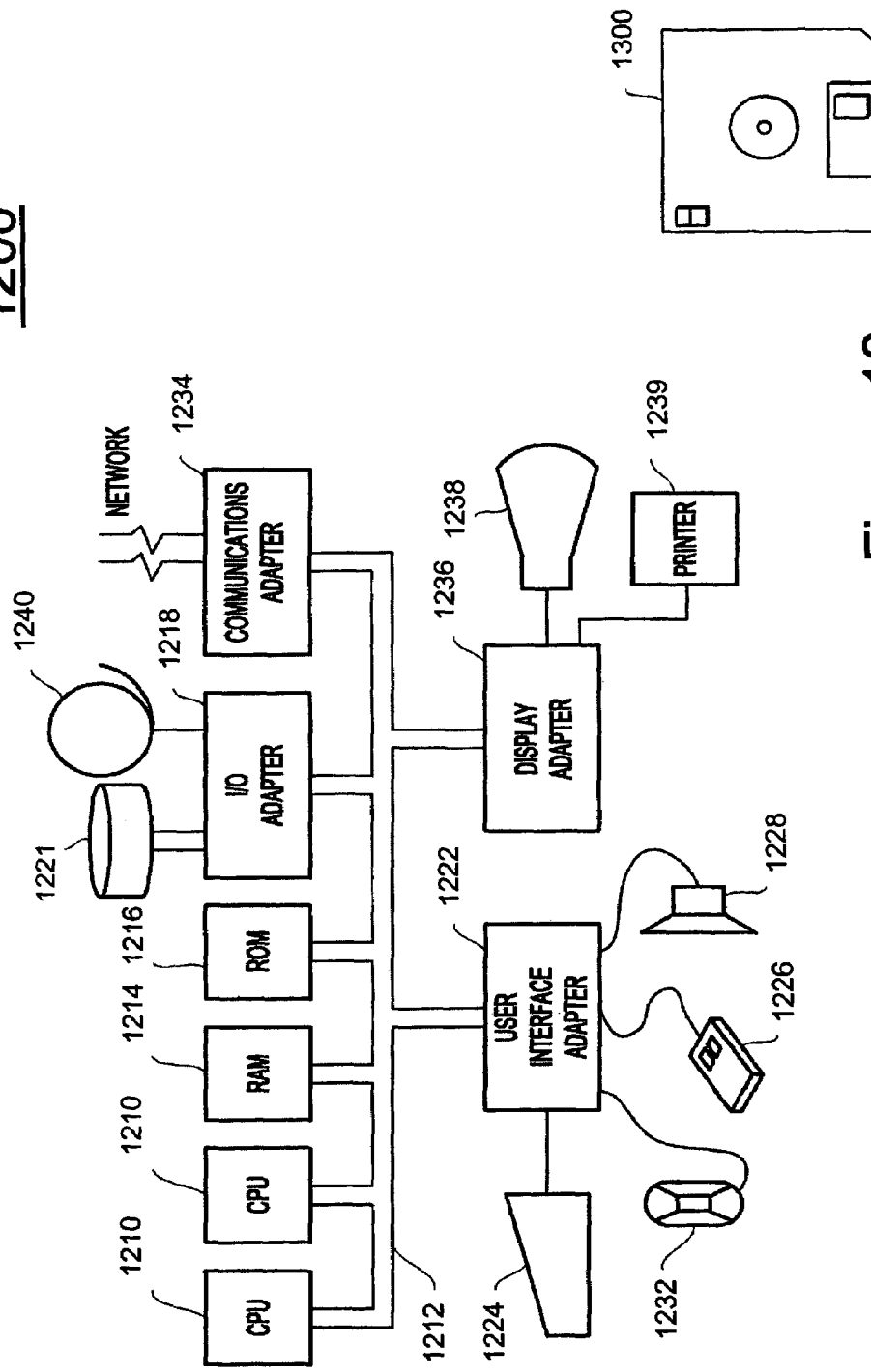

INSTRUCTION SET WITH THERMAL OPCODE FOR HIGH-PERFORMANCE MICROPROCESSOR, MICROPROCESSOR, AND METHOD THEREFOR

CROSS-REFERENCE TO RELATED APPLICATIONS

The present application is related to U.S. patent application Ser. No. 10/892,211, filed on Jul. 16, 2004, to Sri Sri-Jayantha et al., entitled "METHOD AND SYSTEM FOR REAL-TIME ESTIMATION AND PREDICTION OF THE THERMAL STATE OF A MICROPROCESSOR UNIT", assigned to the present Assignee and incorporated herein by reference.

BACKGROUND OF THE INVENTION

1. Field of the Invention

The present invention generally relates to a microprocessor and method therefor, and more particularly to an instruction set with thermal opcode for a high-performance microprocessor and a method therefor.

2. Description of the Related Art

The current generation of 64-bit high-performance microprocessors such as the IBM Power4® have 174 million transistors interconnected with seven layers of copper metallurgy. It is fabricated in 0.18-µm complementary metal oxide semiconductor (CMOS) silicon-on-insulator (SOI), operates around 1.3 GHz and dissipates 140 W in a worst case.

Similarly to other microprocessors, not all parts of the die generate the same amount of heat. Faster or more frequently used circuits (e.g., floating point units (FPUs) and the like, etc.) run at higher temperatures than the rest of the chip, thereby forming "hot spots" on the chip. Since chip reliability is an exponential function of temperature, it is critical to guarantee that no part of the chip exceeds the rated maximum junction temperature. Thus, there is a need to accurately measure temperatures at many locations of a chip.

One way to measure the temperature of the microprocessor is to use a plurality of diodes as temperature sensors. These diodes may be external or internal to the chip.

External temperature diodes are fabricated with semiconductor processes optimized for analog circuits and tend to have better resolution than internal diodes. The current state of the art is measurement resolution to within+/−1 deg C. Internal diodes have to compromise with digital circuits and have much worse specifications.

For example, the Motorola PowerPC® has a temperature sensing diode with+/−4 degree C resolution (e.g., see "Thermal Management System for High Performance PowerPC Microprocessors" by Hector Sanchez et al, IEEE 1063-6390/97, 1997).

It is well known that the forward voltage drop across a diode, Vd, is linearly proportional to the temperature, given by the following equation:

$$Vd=(N*k*T/q)*\ln(If/Is)$$

where N=non-linear factor, k=Boltzman's constant, T=absolute temperature, q=electron charge, If=forward current, Is=saturated current. N and Is are process- and device-dependent. As a result, each diode typically must be calibrated before use.

There are several ways to bypass the calibration. One way is to make one diode much larger than the other(s) (e.g., 32×) and then look at the ratio of the two Vds, as suggested by U.S. Pat. No. 5,829,879, incorporated herein by reference.

Another way is to vary the forward current, If, and also look at the ratio of the two voltages to determine the nonlinear factor. Both ways have substantial penalty: a much larger area (case 1) or multiple current sources (case 2).

Temperature sensing diodes give out about 2 mV/deg C., require stable current source(s), low-noise amplifiers and possibly high-resolution analog-to digital conversion (ADC) for proper operation. It is challenging to integrate all of these analog components with noisy, high-speed digital circuits to measure temperatures accurately at many different locations.

Another practical consideration is that many times, one cannot put the diode sensor directly on/at the "hot-spot" because of space constraints. Indeed, the diode sensor may be positioned at a location where it is many hundreds of transistors away (e.g., on the order of millimeters) from the device of interest. Thus, instead of measuring the temperature of the device of interest, the diode sensor may be erroneously sensing the neighboring device. So, even with the best sensor, some form of spatial extrapolation is still needed to determine the true hot-spot temperature.

Further, to minimize the noise of the diode sensors etc., a low pass filter (LPF) may be employed. However, such a LPF decreases the bandwidth to increase the response time of the sensors, thereby resulting in a lag time on the measurement. Thus, when the temperature rises, such a rise is not necessarily sensed immediately.

SUMMARY OF THE INVENTION

In view of the foregoing and other exemplary problems, drawbacks, and disadvantages of the conventional methods and structures, an exemplary feature of the present invention is to provide a method and structure for sensing temperature in a microprocessor, without necessarily using a temperature diode sensor.

Another exemplary feature of the present invention is to provide a method and structure which judges the instruction stream to be processed in a microprocessor and determines the amount of heat which will be generated thereby, to thereafter take some action.

In a first aspect of the present invention, a method of managing heat in an electrical circuit, includes using a thermal instruction appended to an instruction to be processed to determine a heat load associated with the instruction.

In a second aspect of the present invention, a method of managing heat in a processor, includes examining a thermal instruction appended to an existing instruction to be processed by a processor; and measuring heat generation of the processor in real time, at a plurality of locations to detect local average temperatures and actual transient temperatures.

In a third aspect of the present invention, a microprocessor, includes an execution unit that executes an instruction, the instruction including a thermal instruction appended thereto from which a heat load associated with the instruction is measurable.

In a fourth aspect of the present invention, a system for managing heat in an electrical circuit, includes an execution unit for receiving an instruction to be processed, the instruction including a thermal instruction appended thereto, and a unit for determining a heat load associated with the instruction based on the thermal instruction.

In a fifth aspect of the present invention, an instruction to be processed in a microprocessor, includes an existing instruction for execution by the microprocessor, and a thermal instruction appended to the existing instruction indicating an amount of heat generated by at least one execution unit to be invoked by the existing instruction.

In a sixth aspect of the present invention, an instruction to be processed in a microprocessor, includes an existing instruction for execution by said microprocessor, and a thermal instruction appended to the existing unit indicating an address for indexing a lookup table holding an entry indicating an amount of heat generated by at least one executing unit to be invoked by the existing instruction.

In a seventh aspect of the present invention, a method of managing thermal energy in a microprocessor, includes judging an instruction stream to be processed in a microprocessor, and determining, based on the instruction stream, an amount of heat which will be generated by processing the instruction stream.

In an eighth aspect of the present invention, a signal-bearing medium tangibly embodying a program of machine-readable instructions executable by a digital processing apparatus to perform a method of managing heat in an electrical circuit. The method includes using a thermal instruction appended to an instruction to be processed to determine a heat load associated with the instruction.

With the unique and unobvious aspects of the present invention, a method (and structure) is provided which monitors (tracks) temperature without requiring use of any temperature sensors.

That is, in an exemplary embodiment, new thermal opcodes are added to the existing instruction set to indicate how much heat is being generated by each instruction. By keeping a running sum of the heat being generated, it is possible to map the temperature of each execution unit or any regions of the chip.

Additionally, the inventive method scales with device lithography, avoids the problems with sensor placement, and the slow sensor response time. Thus, the chip and its regions are better protected from thermal damage.

Hence, the invention can look, in advance, at the current instruction having additional information there beside and can tell how much heat will be generated by the processing of the instruction.

Unlike other methods, the invention does not need the actual power generation input (e.g., power measurement), but instead can embed the estimated thermal information (heat) for each instruction to be executed. Hence, without measuring the actual current or resistors, etc., the invention can obtain the amount of heat (joules), based on the instruction processing, which will dissipate at each location.

Thus, the invention has great utility for today's microprocessors and in the future, when one can imagine a large, massive microprocessor (many times bigger than those existing today) executing an elaborate algorithm providing an instantaneous temperature measurement/prediction map across the massive microprocessor. The invention provides a means of managing such heat and avoiding such heat building up at "hot spots" thereon.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 12 illustrates an exemplary hardware/information handling system 1200 for incorporating the present invention therein; and FIG. 13 illustrates a signal bearing medium 1300 (e.g., storage medium) for storing steps of a program of a method according to the present invention.

DETAILED DESCRIPTION OF EXEMPLARY EMBODIMENTS OF THE INVENTION

Figure 1:
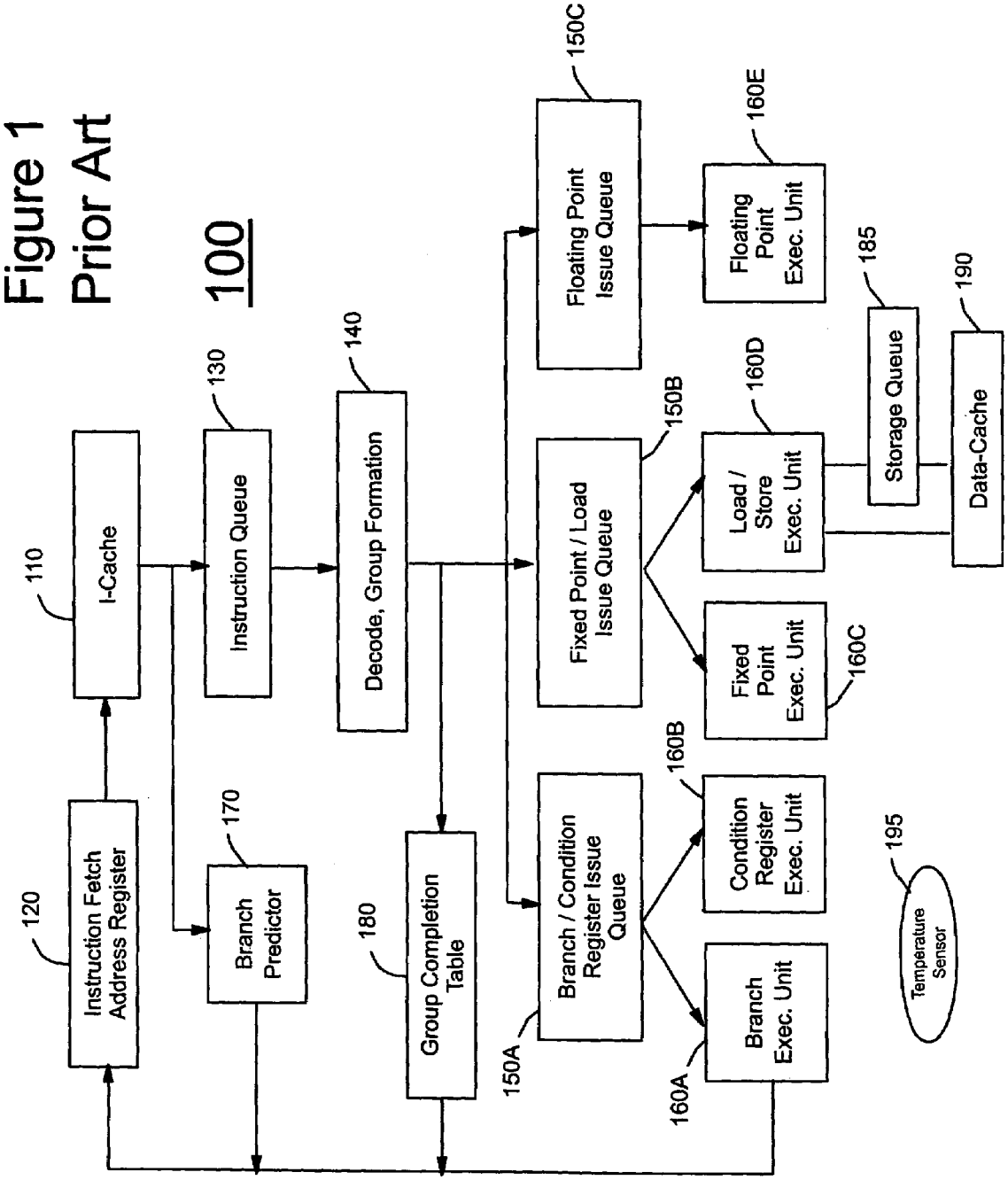
FIG. 1 illustrates a conventional high-performance microprocessor architecture 100.

Referring now to the drawings, and more particularly to FIGS. 1-13, there are shown exemplary embodiments of the method and structures according to the present invention.

Exemplary Embodiment

FIG. 1 shows the architecture of a conventional, exemplary current generation high-performance microprocessor 100, and more specifically a highly simplified block diagram of the IBM Power4® Microprocessor Core which is a speculative superscalar out-of-order execution design.

Instructions are loaded into the 64 KB I-cache 110, starting at the location indicated by the Instruction Fetch Address Register (IFAR) 120. A plurality (e.g., up to eight) of instructions are fetched per cycle into the instruction queue 130 and into the decoder 140 where they are grouped and sent to the appropriate Issue queues 150A (the branch/condition register issue queue), 150B (the fixed point/load issue queue), 150C (the floating point issue queue) and the corresponding Execution units (EU) 160A (branch execution unit), 160B (condition register execution unit), 160C (fixed point execution unit), 160D (load/store execution unit), and 160E (floating point execution unit).

Power4® has two Fixed Point/Load queues and two Floating Point execution units, but only one of each is shown for the reader's ease of understanding. Each output of the queue is sent to the appropriate execution unit. As known, the Fixed Point execution unit adds (or subtracts) two integer values together, whereas the floating point execution unit processes non-integer values. The load/stores can be differentiated into two types of load and store.

Thus, the load/stores obtain instructions from memory, and more specifically from the D-cache (e.g., data cache, etc.) or from the immediate storage queue. If the store queue is closer, then it takes less energy to obtain instructions from the immediate storage queue as opposed to the D-cache.

A multilevel Branch predictor 170 looks ahead at the instructions and loads the IFAR 120 with the "best-guessed" next address. Power4® uses internal diodes for temperature sensor(s) 195 somewhere on the chip for heat management.

To load the code, the address from the instruction fetch address register 120 is used. The address is generated in one of three ways. One way is through the branch predictor 170 which looks at the incoming instruction from the I-cache 110 and, for example, may see that a loop is to be (or being) performed, and that a next set of instructions is needed. Thus, the branch predictor 170 sends the next instruction address.

Another way is through the group completion table 180 in which instructions may be executed out of order. The group completion table 180 keeps track of which instructions have been performed.

The third way is through a a jump. Any one of the three can modify the address of the next block of instructions to be loaded.

Thus, FIG. 1 shows a high-level schematic/view of the microprocessor. It is noted that, for brevity, not all of the operations/functions of the microprocessor are shown in FIG. 1, but instead it is narrowed down how the instructions are executed and processed within the microprocessor and how new branches are generated.

More detailed operations of the Power4® architecture can be found in "Power4 System Microarchitecture" by Tendler et al., IBM Journal of Research & Development, Volume 46, Number 1, January 2002.

It should be noted that the present invention can be used with the exemplary architecture of FIG. 1, but is certainly not limited for use only with the architecture of FIG. 1.

Figure 2:
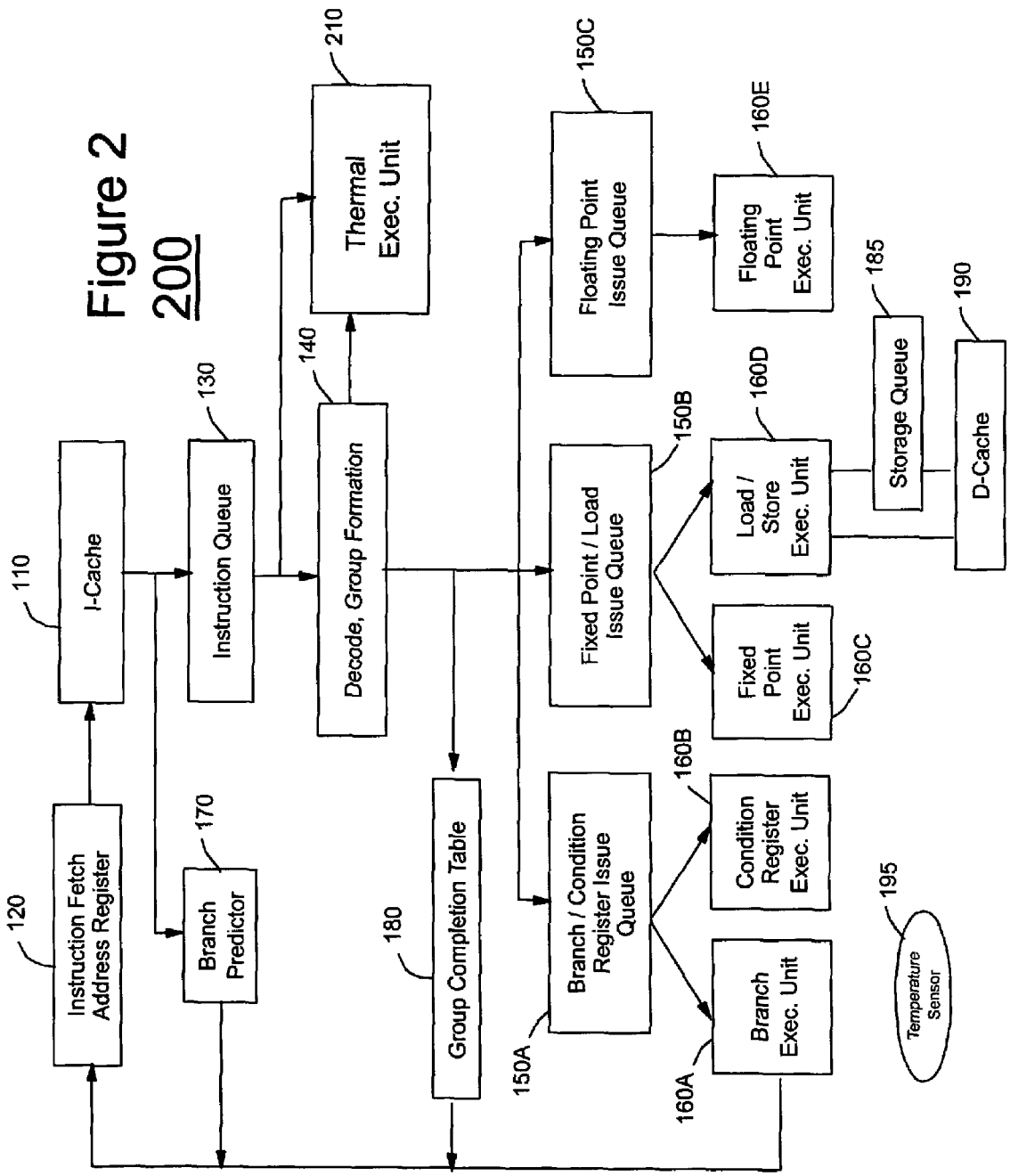
FIG. 2 illustrates a microprocessor architecture 200 with thermal execution unit 210.

FIG. 2 shows the addition of a Thermal execution unit 210 to the microarchitecture of FIG. 1. The instruction queue 130 information and decode, group formation 140 information are sent to the Thermal EU 210. The Thermal EU 210 decodes the thermal op-code portion of the instruction and keeps the running sum of the heat being generated by the current instruction stream. Thus, the thermal execution unit 210 knows what instruction is being run and in what order.

The Thermal EU 210 runs in locked-step with the Instruction Decoder and again takes advantage of the Group Formation output to handle out-of-order instruction execution. The inner working of the Thermal EU 210 will be discussed in detail later on. In this configuration, the thermal instructions are stored along with the normal instructions in the I-cache 110 and the Thermal EU 210 only analyzes the executing instructions.

Figure 3:
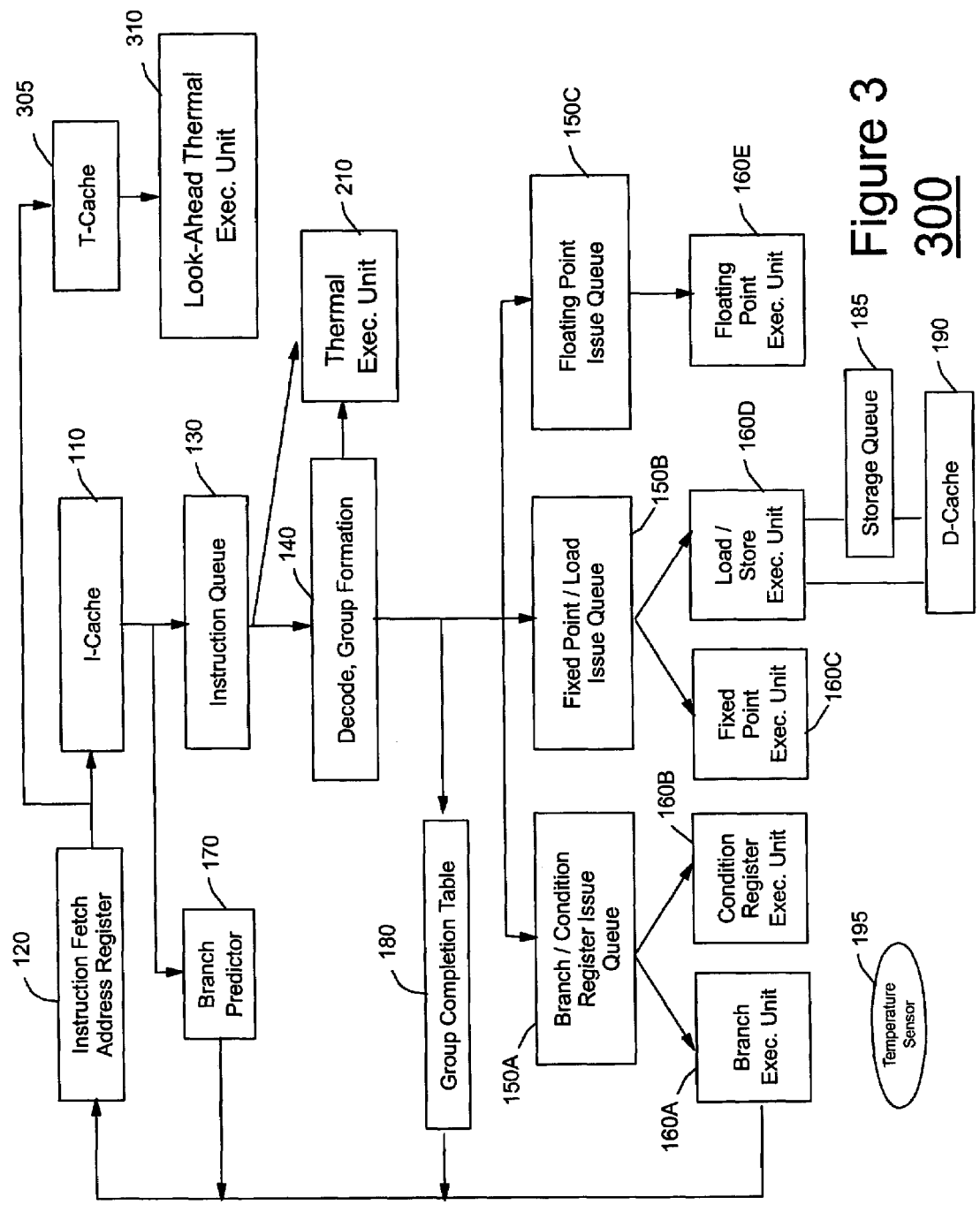
FIG. 3 illustrates a microprocessor architecture 300 with look-ahead thermal execution unit 310.

FIG. 3 shows a configuration which allows determining ahead of time what unit(s) will be heated before the instruction is executed. To do so, one must look at the instructions before they are executed. Thus, in FIG. 3, a T-cache (thermal cache) 304 which receives the instruction fetch address (in addition to being provided to the I-Cache 110) and a look-ahead thermal execution unit 310 are provided.

Hence, in the configuration of FIG. 3, instructions are loaded into I-cache 110 and the corresponding thermal op-codes are loaded into the Thermal cache 304. The T-cache 305 has additional logic such that as thermal op-code is loaded, it is processed by the Look-ahead Thermal EU 310. This provides a mechanism to predict what the future heat load will be if the current instructions in the I-cache 110 are executed. Of course, this information will be updated any time a new address is loaded into the Instruction Fetch Address Register 120, either by the Branch EU 160A, the Group Completion Table 180 or the Branch predictor 170. This concept could be extended to L2/L3 caches to predict heat load further out into the future.

Figure 4:
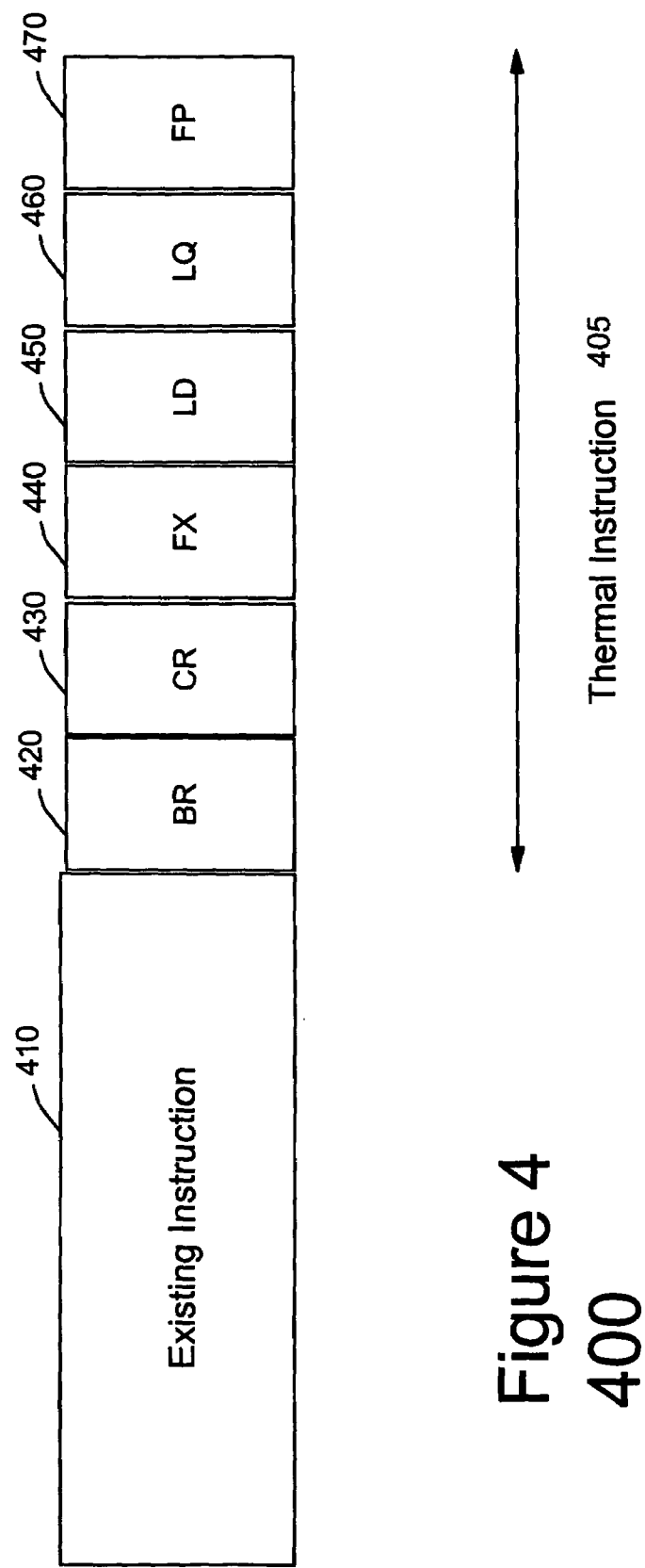
FIG. 4 illustrates a thermal instruction 400.

As shown in FIG. 4, a thermal Instruction 405 is appended to each existing microprocessor instruction 410. For this particular example, the thermal instruction may include 6 bits (ignoring the duplicate Fixed Point and Load/Store units for simplification).

Each bit indicates which execution unit is invoked by a particular instruction. BR 420, CR 430, FX 440, LD 450, LQ 460 and FQ 470 refer to the Branch, Condition Register, Fixed Point, Load/Store from/to the D-cache, Load/Store from/to Storage queue, and Floating Point Unit, respectively. Separate bits are used for indicating an access to the storage queue or to the D-cache because each type of access incurs different level of energy consumption. It is noted that, if specific instructions are missing (e.g., no load from queue instruction, no branch instruction, etc.), then there would be no corresponding bit representing this "missing" instruction.

For other microarchitectures with more execution units, additional bits will be required. For the case of multiple execution units doing the same function (e.g., two Floating point units; two branch units, etc.), two bits may be used (e.g., FX1, FX2; BR1, BR2, etc.). Additionally, one can optimize the them (the bits) in that while one bit is being shown for each execution unit in the current configuration, many times certain operations/instructions/jobs may not be present, and thus there may be no (or little) need to track certain units and the heat generated therefrom.

Thus, an important aspect of the invention is to modify the existing instruction set by augmenting it with the additional bit(s).

Figure 5:
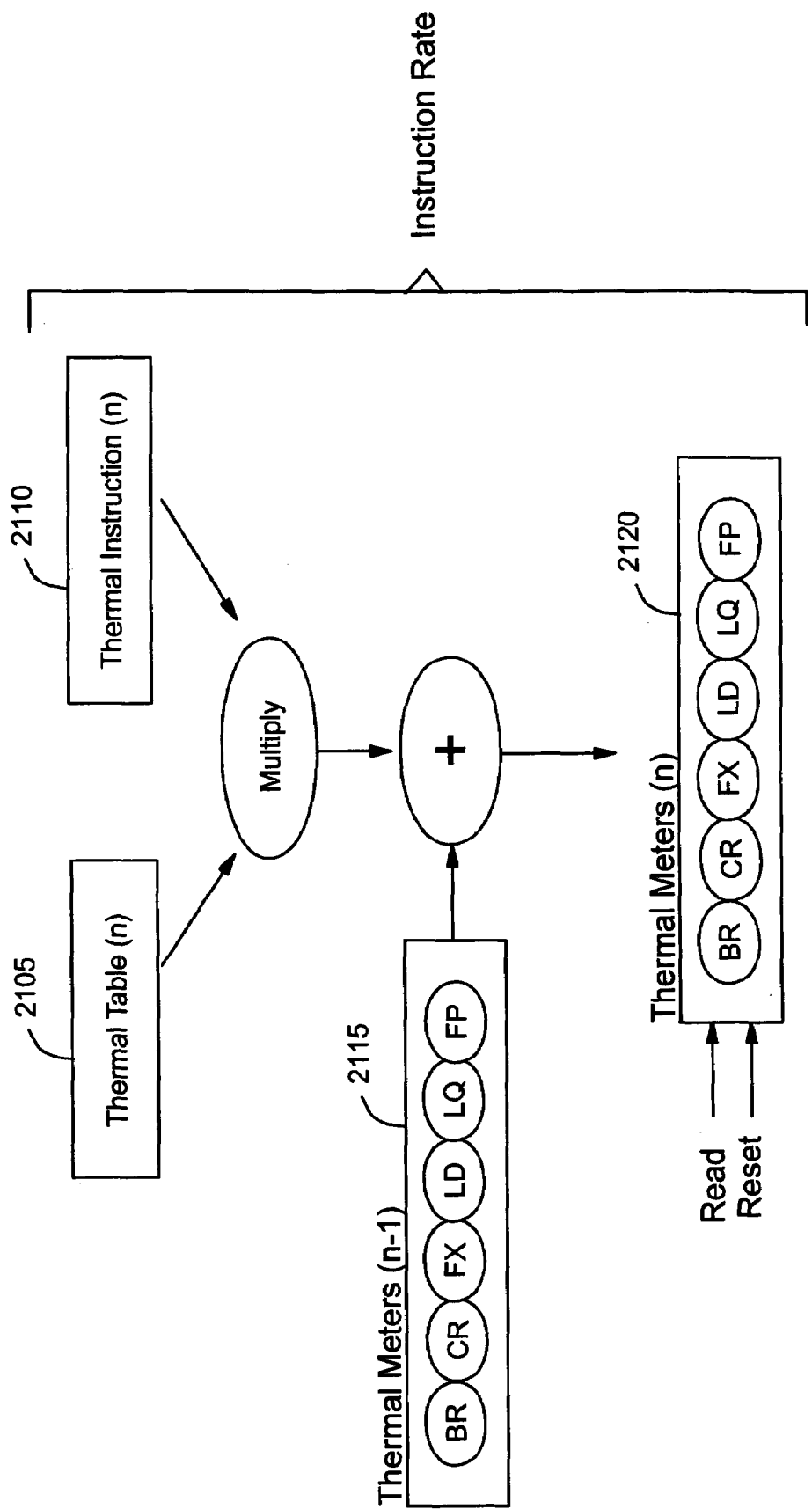
FIG. 5 illustrates detail of the thermal execution unit 210.

FIG. 5 shows one exemplary implementation of the thermal execution unit according to the present invention, and specifically shows that on every instruction cycle, N bits of the thermal op-code 2110 are multiplied with N entries of the Thermal table 2105, and then added to the running sum of the Thermal meter (n−1) 2115 of each execution unit (EU). Typically, there is one meter per execution unit. This operation can be analogized to an electrical meter used for household use.

Each entry of the thermal table 2105 indicates the amount of heat generated by the corresponding execution unit when it runs. A "0" in the op-code means that the matching EU does not run, and thus that no heat will be added.

The opposite value is a "1" in the op-code. In this configuration, the vector multipliers and adders run at an instruction rate which is on the order of Ghz and accumulate the heat generated by individual EU. Since heat propagation is a lot slower, the Thermal meters 2115 can be sampled at a much slower pace.

It is envisioned that the Thermal meters (n) 2120 are read and reset at tens to hundreds of microsecond rate. The thermal sampling rate depends on many variables such as the instruction rate, device size/geometry/material, and the chip thermal conductivity.

The Thermal table 2105 is loaded with the appropriate values at power-up, and could be updated during operation based on the condition of the chip. There are many ways to determine these values.

For current microprocessor design, one way is to break the design down to Register-Transfer-Level (RTL) and estimate power consumption based on capacitance, net length, area and switching activities. Commercial simulation software such as Power Theater (e.g., see "Power4® System Microarchitecture" by Tendler et al., IBM Journal of Research & Development, Volume 46, Number 1, January 2002) or IBM Common Power Analysis Method (CPAM) (e.g., see "CPAM: A Common Power Analysis Methodology for High-Performance VLSI Design", Proceedings of the 9th Topical Meeting on the Electrical Performance of Electronic Packaging, 2000, pp. 303-306, Scott Neely, Howard Chen, Steven Walker and Thomas Bucelot) could be used as the starting point. U.S. Pat. No. 5,557,557, September 1996, "Processor Power Profiler", to Frantz et al., proposes a method for determining the energy consumption of a processor when executing a program.

U.S. Pat. No. 5,941,991, August 1999, "Method of Estimating Power Consumption of each instruction processed by a microprocessor", Kageshima et al. takes into account the cache hit/miss of instruction. U.S. Pat. No. 6,338,025B1, January 2002, "Data Processing system and method to estimate power in mixed dynamic/static CMOS designs", to Bowen et al., handles the power simulation of the dynamic CMOS circuits.

With the above tools and methods, a good estimate of the power consumed by each EU can be obtained.

A next step would be to use the model of the physical circuit layout and translate the power consumption number into the heat-rise-per-instruction, which can be referred as "heat quanta." For example, if the floating-point multiply instruction causes the floating point unit to rise 5 microdegrees C., then this instruction has 5 heat quanta and 5 will be loaded into the Thermal table 2105. This translation process preferably should take into account the heat resistance and capacitance of each device in the 3-dimensional space.

Thus, for current microprocessor design, there are many simulation tools to allow one to know, for each instruction, how many transistors are being switched, and what device that the transistor is driving, thereby to know how much heat is being generated and the location where the heat is being generated.

It is noted that another important feature of FIG. 5 is that all of the units (circuits) are being run at instruction rate (e.g., currently about 2-3 Ghz). Thus, by keeping track of the heat, much heat is generated by the process itself since the real-time multiplying at the Ghz rate.

Figure 6:
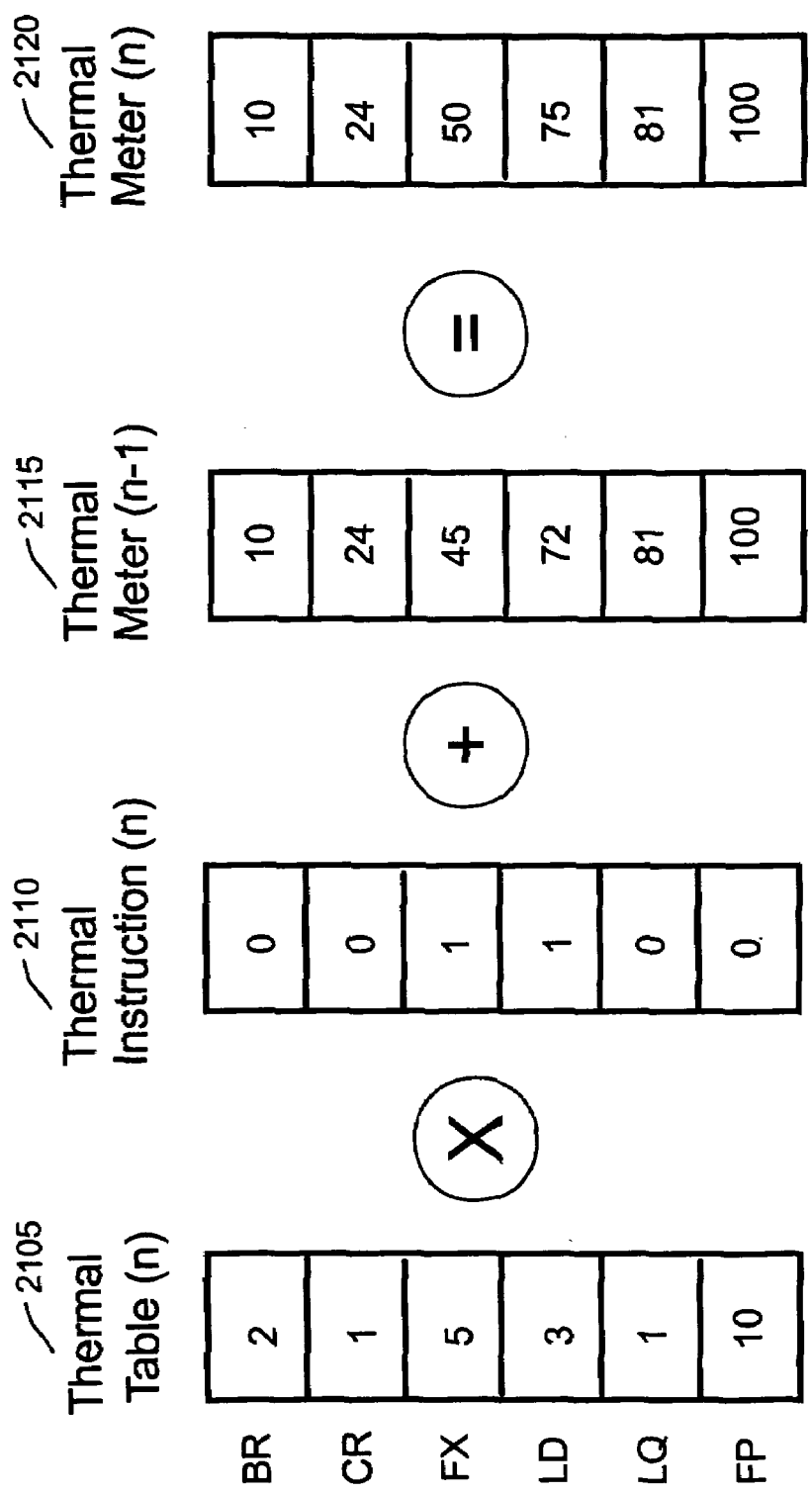
FIG. 6 illustrates an example 600 of a thermal execution unit.

FIG. 6 illustrates an example of the configuration shown in FIG. 5. Assume that the Branch, Condition Register, Fixed-point, Cache Load/Store, Queue Load/Store and Floating-point units generate 2, 1, 5, 3, 1 and 10 heat quantas, respectively. Thus, the condition register (CR) does not perform much work (e.g., create much heat), whereas the floating point produces a relatively large amount of heat.

For a particular instruction which uses only the Fixed-point (FX) and cache Load/Store (LD), the thermal op-code for this instruction would be "001100". Thus, 5 and 3 quantas would be added to the running sum of the Thermal Meter, where "n" is defined as the current state (e.g., thermal meter 2120) and "n−1" (e.g., thermal meter 2115) is the previous state. As a result, one now has 50 and 75 quantas for the FX and LD. The rest of the Thermal Meters remain unchanged.

It is noted that, in the exemplary application described above, the heat number value being generated (thermal meter) is cumulative over a period of time. However, the thermal meter may be something different or of a different type depending upon the designer's requirements and constraints.

That is, instead of a thermal meter which corresponds to cumulative heat being released over a certain time period, in another exemplary application and using an actual model which uses this information, it may be possible not to require the thermal meter to operate in a cumulative mode. Instead, it could be sufficient to simply use the output (product) of thermal table 2105 and thermal instruction 2110, as an input to a thermal estimator. A thermal estimator typically has built-in dissipative elements therein such as resistors having thermal resistances, etc., and such elements can choose how fast the dissipated heat quantas will eventually get dissipated based on the overall system cooling architecture.

Hence, one can imagine a situation in which one processor may use liquid cooling and another processor uses a different heat dissipation mechanism (passive, heat sink, etc.). Indeed, even if the another processor uses liquid cooling, if the thermal paste which connects the cooling device to the processor is slightly off (different) due to mechanical tolerances, the dissipation rates are going to be different. Thus, other activities may be helpful to determine the dissipative parameters as part of the full implementation.

Hence, in the case at hand, the thermal meter will be increasing or staying fixed, and thus the read and reset operations will be performed by the thermal estimator. Indeed, one of the advantages of the thermal meter is that even though the number(s) is (are) being added at each instruction cycle, for the actual thermal model implementation, one does not need as fine a level of thermal dissipation information. Instead, one may simply find the sum, for example, for every thousand executions. Hence, one may use cumulative information, but not necessarily from time 0.

Figure 7:
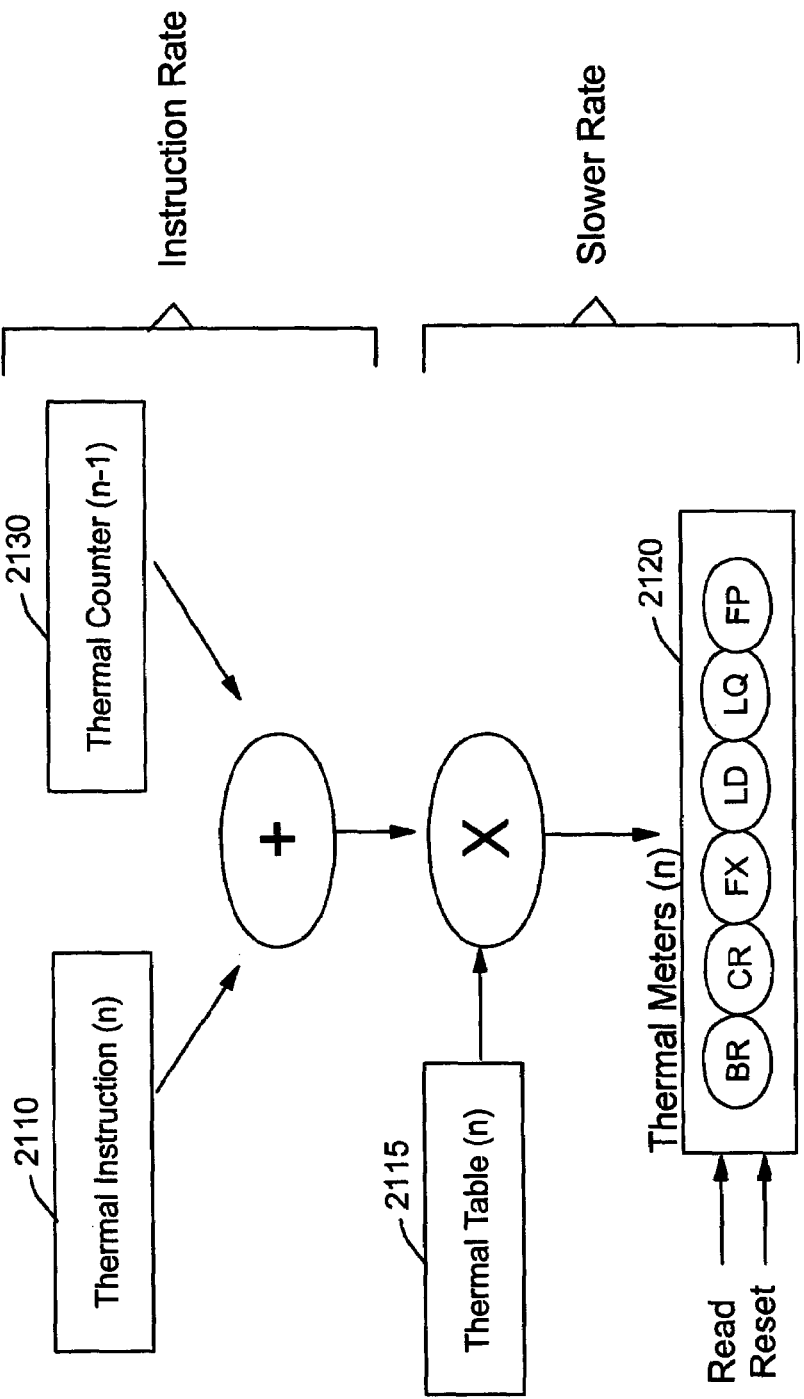
FIG. 7 illustrates multi-rate thermal execution unit 700.

Turning to FIG. 7, it is shown that the power consumption of the Thermal EU can be substantially reduced by reversing the order of operation from that shown in FIG. 6. That is, the order of the multiplication operation and the addition operations of FIG. 6 are reversed, as shown in FIG. 7.

In FIG. 7, the thermal instruction 2110 is added to the previous state of the Thermal counter 2130 at instruction rate and the multiplication with the Thermal table 2115 is done at the slower thermal sampling rate. The adders are much simpler now because they only add by 1. Simple increment counters (e.g., 1-bit counters) can be used for this operation instead of the full adders like before.

Figure 8:
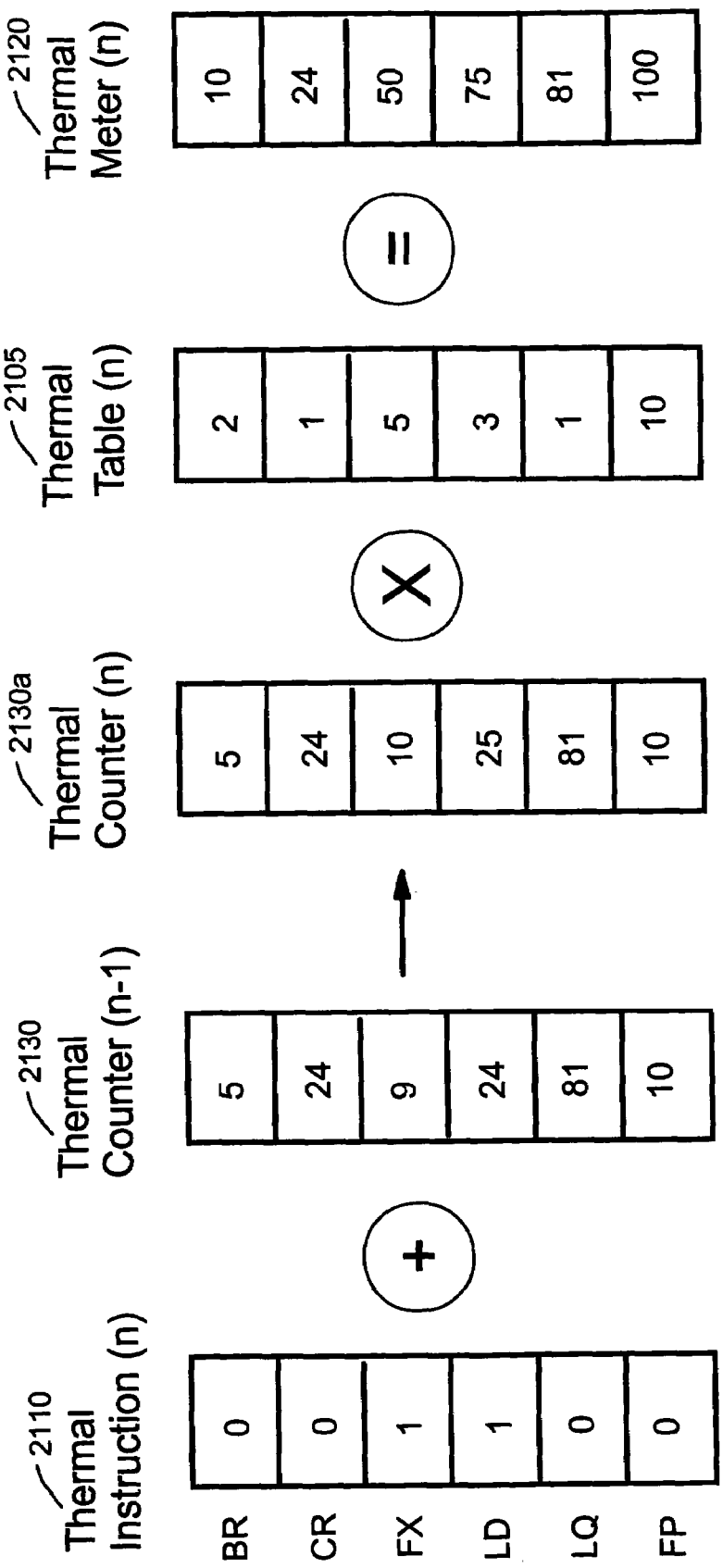
FIG. 8 illustrates multi-rate thermal execution unit example 800.

For the same Thermal instruction ("001100"), Thermal table (n) 2105, and equivalent Thermal counter 2130 (n−1) and 2130a values, the Thermal meters (n) 2120 give the same readings (e.g., the same as those in FIG. 6), as shown in FIG. 8.

Thus, in FIG. 7, the relatively faster instruction rate (shown in the top portion of the schematic of FIG. 7 and on the order of GHz) is distinguished from the relatively slower rate (e.g., the rate shown in the operation on the bottom portion of FIG. 7; also known as the thermal response time).

So, instead of multiplying the heat generated by each instruction as in FIG. 6, in FIG. 7, one counts the number of instructions executed for each unit (e.g., running at instruction rate), then only what is in the thermal table 2115 is multiplied when it is needed at a slower rate and the thermal meter 2120 will be the same as in FIG. 6. Again, the same result is achieved as FIG. 6, but with a much simpler circuit. This embodiment is useful for situations when there is a need to sum a significant number of instruction cycles before one needs the thermal information. Thus, a multiplication operation is not necessarily needed every cycle. Instead, summing can continue each cycle, but multiplication can be performed selectively when one needs the thermal information.

The thermal instruction 2110 should be as short as possible to minimize cost. One way to keep the thermal instruction short is to monitor only EUs that are heavily used.

For example, the Branch unit is not likely to be used in every instruction. Thus, it may not need to be monitored. For some microarchitecture, the fixed-point unit is used the most. In such a case, only this EU and some key neighboring EUs which contribute to the heat load of the fixed-point unit should be monitored.

As noted above, there can be one bit per execution unit. However, this may not be an efficient use of the number of bits, since the bits are being added to each instruction (increased by 1 and being multiplied thereafter) and thus this can become a very large increment. Thus, it would be helpful to find a way to encode the thermal instruction to make it more space efficient.

Figure 9:
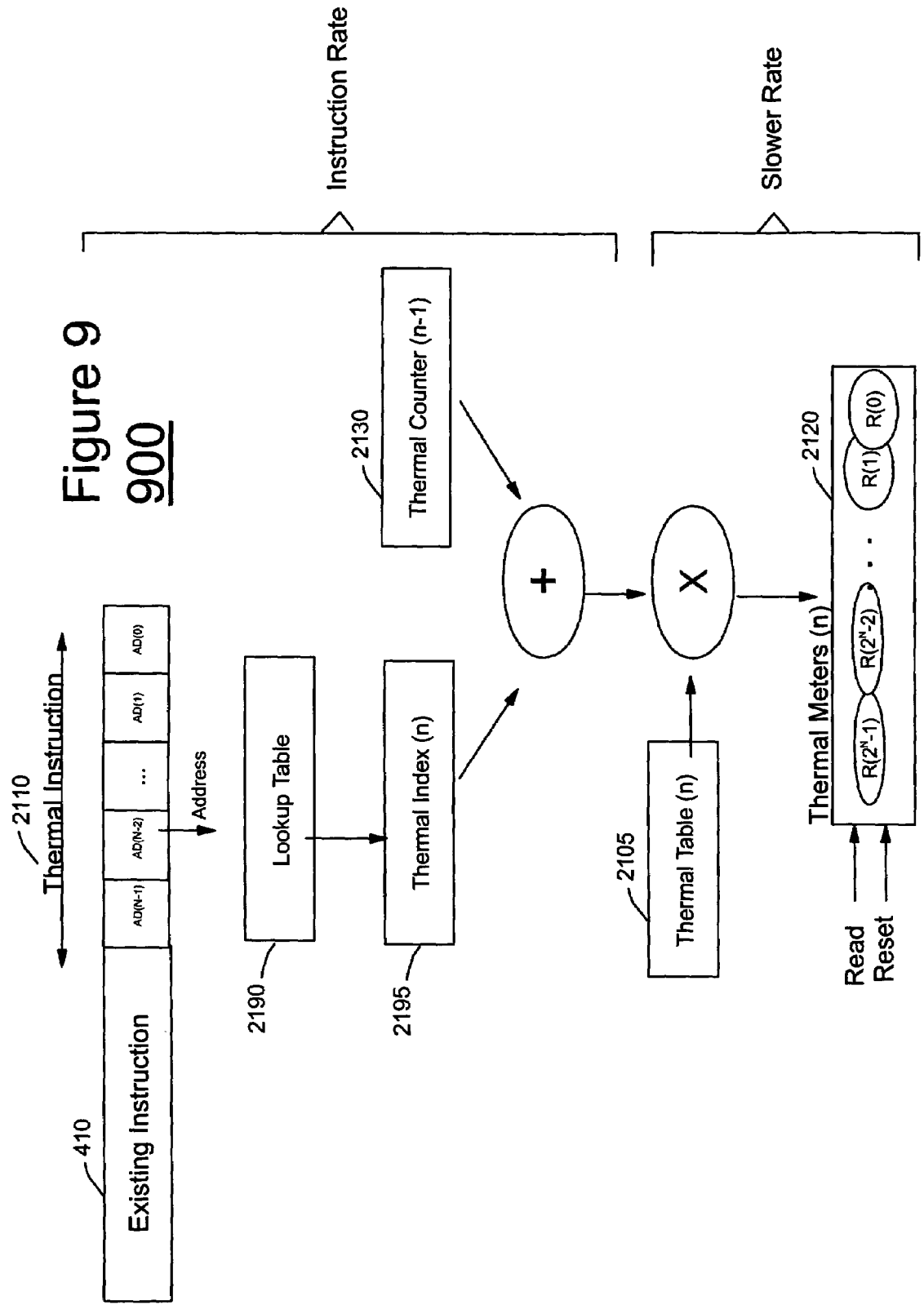
FIG. 9 illustrates encoded thermal execution unit 900.

Thus, another way is to binary encode the thermal instruction. FIG. 9 shows a N-bit thermal op-code that manages $2^N$ regions. The thermal op-code provides the index or address to a Lookup table (LUT) 2190 containing $2^N$ entries. The addition and multiplication operations are the same as in FIG. 7. The Thermal Meters 2120 show the accumulated heat in regions 0 to $(2^N-1)$.

Figure 10:
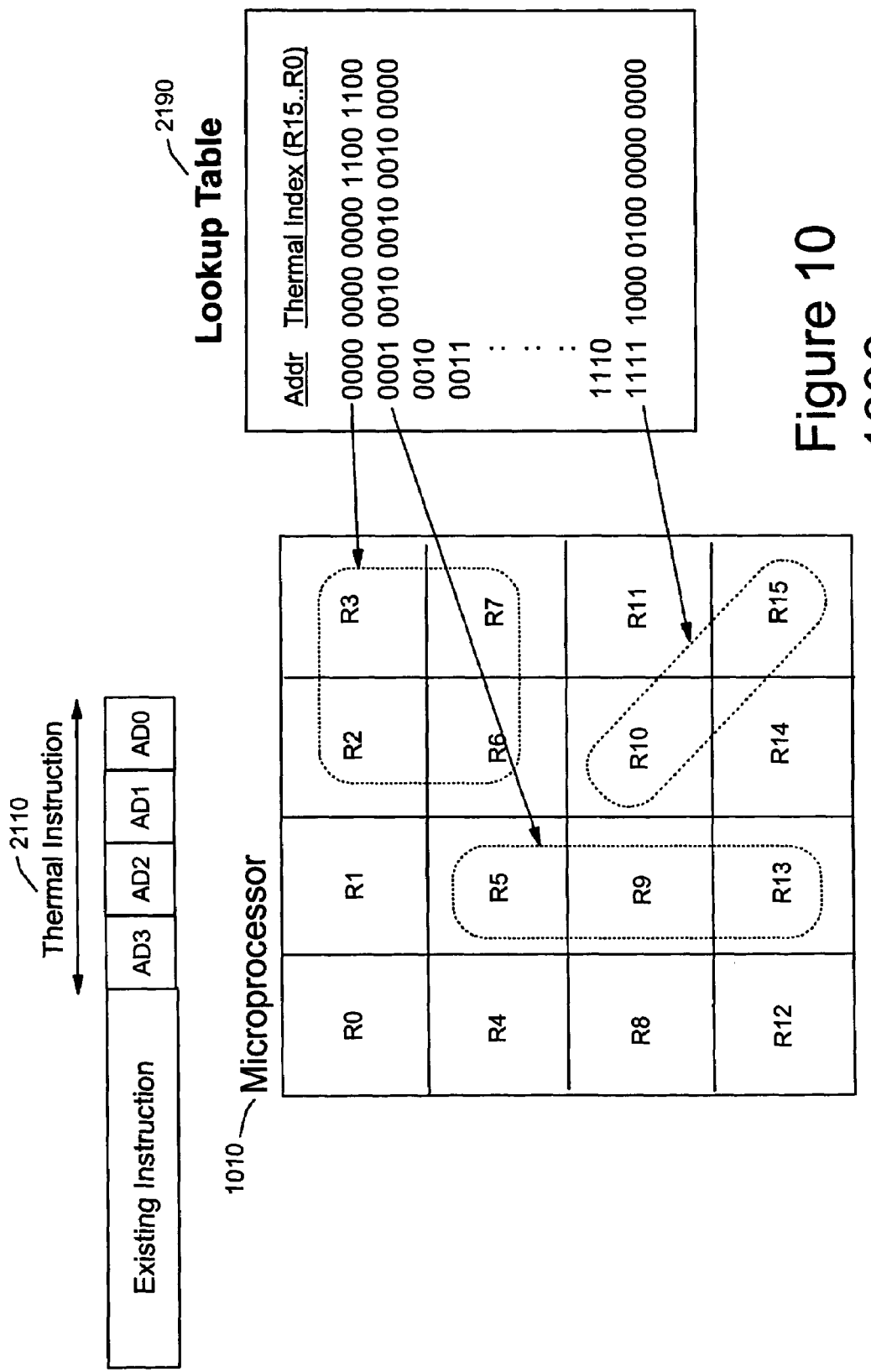
FIG. 10 illustrates an encoded thermal execution unit lookup table 1000.

Thus, in FIG. 9, instead of each bit representing an execution unit as previously described, each bit would go through the LUT 2190 which would translate the bit into the corresponding space on the chip (e.g., microprocessor 1010), as shown in a structure 1000, as shown in FIG. 10.

For example, a 4-bit thermal instruction provides the necessary address to index a 16-entry LUT 2190 and keeps track of 16 regions of the chip (e.g., microprocessor 1010), as shown in a structure 1000 of FIG. 10. Each entry of the LUT 2190 can refer to a single region or multiple regions. In this example, the Thermal instruction (address) "0000" points to entry 0 of the LUT 2190 which tracks regions R2, R3, R6 and R7. Thermal instruction (address) "0001" would point to R5, R9, and R13. Further, thermal instruction (address) "1111" may point to a diagonal region of R10 and R15. With such an exemplary mapping, up to 16 regions can be covered with just 4 bits.

Thus, instead of one bit per execution unit, the address will be carried in the instruction to index the LUT 2190, thereby to get the thermal index 2195 just as before in FIG. 8.

Figure 11:
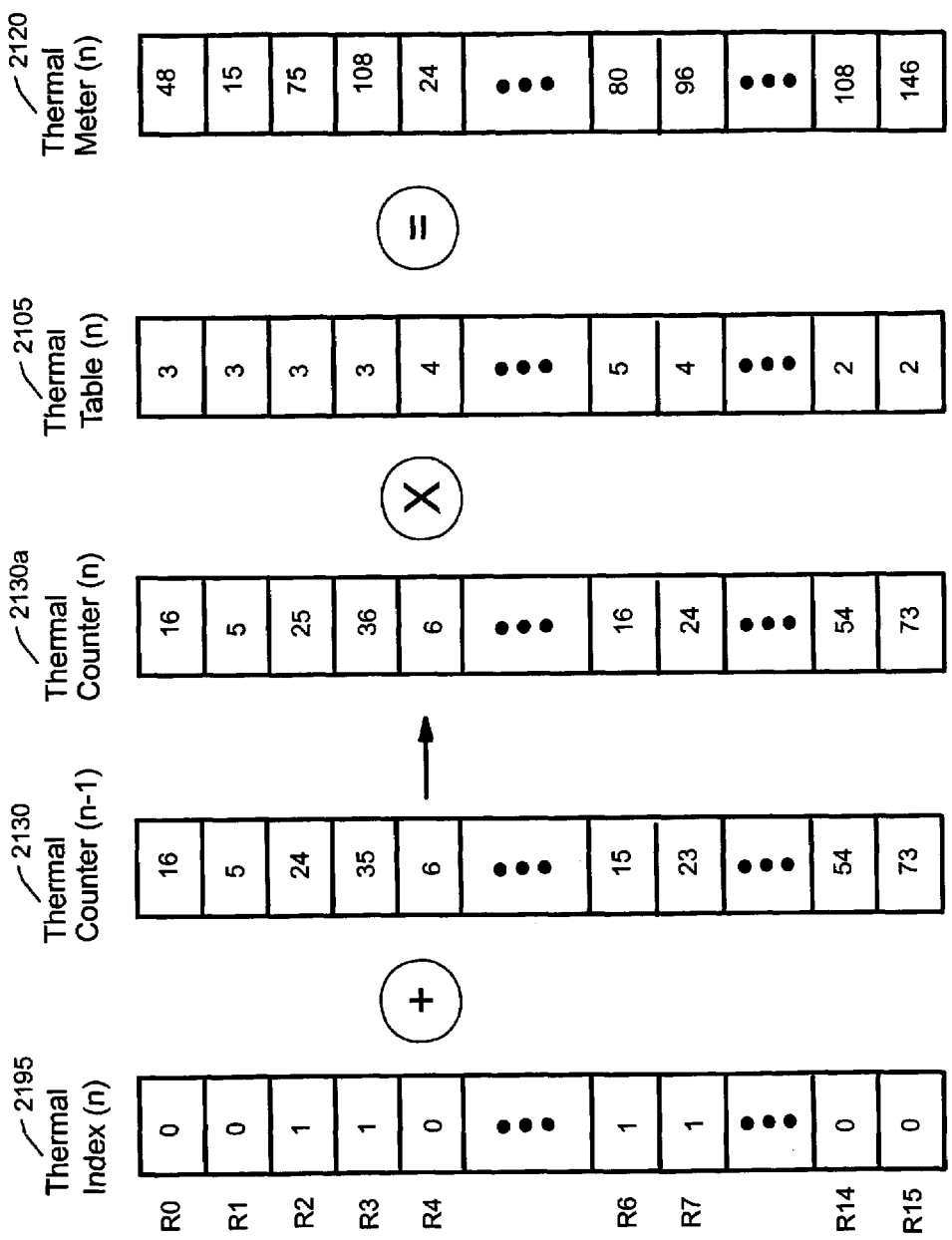
FIG. 11 illustrates an encoded thermal execution unit example 1100.

FIG. 11 shows an example in which address "0000" which affects regions R2, R3, R6, and R7. FIG. 11 shows that the Thermal counters increment by 1 for each region with a "1" index, when added to the running count. The Thermal Meter values are the products of the Thermal counters and the Thermal Tables.

In contrast to the embodiment in which four bits would correspond to 4 execution units being employed regardless of whether they are generating heat or not, the configuration (and use of 4 bits) of FIG. 10 (and as shown by FIG. 11) which uses the same 4 bits as an address generator which point to a table (LUT) 2190, now provides 16 sets of information from the 4 bits, and thus enhances the ability to broaden out the thermal information. The cost is the extra step of going to the table. The table provides the information regarding which regions are participating and which are not (e.g., shown by the "0"s and "1" of FIG. 10).

The output of the Thermal EU can be coupled with new or existing Dynamic Thermal Management or spot-cooling technique to regulate the maximum junction temperature of the microprocessor (e.g., see the above-mentioned U.S. patent application Ser. No. 10/892,211, entitled "METHOD AND SYSTEM FOR REAL TIME ESTIMATION AND PREDICTION OF THE THERMAL STATE OF A MICROPROCESSOR UNIT", by S. M. Sri-Jayantha et al., and "Dynamic Thermal Management for High-Performance Microprocessor", David Brooks and Margaret Martonosi, IEEE 2001, 0-7695-1019-1/01.

FIG. 12 illustrates a typical hardware configuration of an information handling/computer system for use with the invention and which preferably has at least one processor or central processing unit (CPU) 1211.

The CPUs 1211 are interconnected via a system bus 1212 to a random access memory (RAM) 1214, read-only memory (ROM) 1216, input/output (I/O) adapter 1218 (for connecting peripheral devices such as disk units 1221 and tape drives 1240 to the bus 1212), user interface adapter 1222 (for connecting a keyboard 1224, mouse 1226, speaker 528, microphone 1232, and/or other user interface device to the bus 1212), a communication adapter 1234 for connecting an information handling system to a data processing network, the Internet, an Intranet, a personal area network (PAN), etc., and a display adapter 1236 for connecting the bus 1212 to a display device 1238 and/or printer.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

This signal-bearing media may include, for example, a RAM contained within the CPU 1211, as represented by the fast-access storage for example. Alternatively, the instructions may be contained in another signal-bearing media, such as a magnetic data storage or CD-ROM diskette 1300 (FIG. 13), directly or indirectly accessible by the CPU 1211.

Whether contained in the diskette 1300, the computer/CPU 1211, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Additionally, in yet another aspect of the present invention, it should be readily recognized by one of ordinary skill in the art, after taking the present discussion as a whole, that the present invention can serve as a basis for a number of business or service activities. All of the potential service-related activities are intended as being covered by the present invention.

With the unique and unobvious aspects of the present invention, a method (and structure) is provided which monitors (tracks) temperature without necessarily using any temperature sensors. Instead, in an exemplary embodiment, new thermal opcode may be added to the existing instruction set to indicate how much heat is being generated by each instruction. By keeping a running sum of the heat being generated, the temperature of each execution unit or any regions of the chip may be mapped.

Additionally, the inventive method scales with device lithography, avoids the conventional problems associated with sensor placement, and the slow sensor response time. Thus, the chip and its regions are better protected from thermal damage. Moreover, each instruction can be looked at in advance and can have additional information beside the current instruction and it is possible to determined how much heat will be generated by the processing of the instruction.

The invention need not have the actual power generation input (e.g., power measurement), but instead can embed the estimated thermal information (heat) for each instruction to be executed. Hence, without measuring the actual current or resistors, etc., the invention can obtain the amount of heat (joules), based on the instruction processing, which will dissipate at each location.

Thus, the invention has great utility and can manage heat and avoid such heat building up at "hot spots" on a chip.

While the invention has been described in terms of several exemplary embodiments, those skilled in the art will recognize that the invention can be practiced with modification within the spirit and scope of the appended claims.

For example, while the invention has been described for use and incorporation into the exemplary architecture of FIG. 1, the invention is by no means limited for use or incorporation into such an architecture. Indeed, many other different architectures could be employed as would be evident to one of ordinary skill in the art taking the present application as a whole.

Further, it is noted that, Applicant's intent is to encompass equivalents of all claim elements, even if amended later during prosecution.

What is claimed is:

1. A method of estimating dissipation of heat in an electrical circuit comprising a microprocessor which includes an execution unit and a thermal execution unit, said method, comprising:
   using a thermal instruction appended to an instruction to be processed to determine a heat load associated with said instruction; and
   multiplying, at an instruction rate, a value of the heat load generated by an instruction, by a value representing an occurrence of said instruction to obtain a product, and adding the product to a running sum of heat generated previously wherein the thermal execution unit decodes said thermal instruction appended to said instruction and keeps a running sum of heat being generated by a current instruction stream,
   wherein said thermal execution unit comprises a multiplier and an adder,
   wherein on every instruction cycle, in said thermal execution unit, said multiplier multiplies N bits of said thermal instruction with N entries of a thermal table to produce a product, and said adder adds said product to a running sum of a thermal meter of said thermal execution unit, and
   wherein said thermal execution unit comprises a thermal meter per execution unit.

2. The method of claim 1, further comprises:
   measuring a heat generation of said microprocessor in real time, at multiple locations to detect local average temperatures and actual transient temperatures.

3. The method of claim 2, further comprising:
   measuring the heat load of a current instruction and future heat load generated by future instructions still in a memory of said microprocessor.

4. The method of claim 3,
   wherein a value in said thermal table represents an instruction execution unit of said microprocessor.

5. The method of claim 4, further comprising:
   determining said instruction associated with an execution unit which is used a predetermined small amount of time such that said instruction is bypassed in determining the heat load.

6. The method of claim 2, further comprising:
   examining a thermal instruction appended to an existing instruction to be processed by said processor; and
   measuring heat generation of said microprocessor in real time, at a plurality of locations to detect local average temperatures and actual transient temperatures.

7. The method of claim 6, further comprising:
   measuring the heat load of a current instruction and future heat load generated by future instructions still in a memory of said microprocessor.

8. The method of claim 1, further comprising:
   binary encoding of the thermal instruction such that the thermal instruction provides an index to a Lookup table (LUT) containing $2^N$ entries, wherein N is an integer.

9. The method of claim 8, further comprising:
   modifying an existing instruction set by augmenting said existing instruction set with an additional bit.

10. The method of claim 9,
    wherein each said additional bit points to the LUT which translates the additional bit into a corresponding space on said microprocessor.

11. The method of claim 1, wherein an N-bit thermal instruction provides an address to index a $2^N$-entry LUT and keeps track of $2^N$ regions of the microprocessor.

12. The method of claim 11, wherein each entry of the LUT refers to one of a single region and multiple regions.

13. The method of claim 1, wherein a bit is provided for each execution unit of said microprocessor.

14. A microprocessor, comprising:
    an execution unit that executes an instruction, said instruction including a thermal instruction appended thereto from which a heat load associated with said instruction is measurable; and
    a thermal execution unit running at an instruction rate, having a modifiable thermal table and a plurality of thermal meters,
    wherein the thermal execution unit decodes said thermal instruction appended to said instruction and keeps a running sum of heat being generated by a current instruction stream wherein said thermal execution unit comprises a multiplier and an adder,
    wherein on every instruction cycle, in said thermal execution unit, said multiplier multiplies N bits of said thermal instruction with N entries of a thermal table to produce a product, and said adder adds said product to a running sum of a thermal meter of said thermal execution unit, and
    wherein said thermal execution unit comprises a thermal meter per execution unit.

15. The microprocessor of claim 14, wherein said thermal execution unit is controlled to selectively operate at a plurality of rates.

16. The microprocessor of claim 14, wherein said thermal execution unit is encoded to minimize a length of said thermal instruction.

17. The microprocessor of claim 14, wherein said thermal execution unit includes a thermal lookup table (LUT) which maps a plurality of regions of said microprocessor.

18. The microprocessor of claim 14, wherein each bit of said thermal instruction indicates which execution unit is invoked by a particular instruction.

19. The microprocessor of claim 14, wherein instructions associated with a certain execution unit are selectively ignored in determining the heat load.

20. The microprocessor of claim 17, wherein each entry of the thermal table indicates an amount of heat generated by the corresponding execution unit when said corresponding execution unit runs.

21. A system for estimating dissipation of heat in an electrical circuit, comprising:
an execution unit for receiving an instruction to be processed, said instruction including a thermal instruction appended thereto; and
a thermal execution unit running at an instruction rate, having a modifiable thermal table and a plurality of thermal meters,
wherein the thermal execution unit decodes said thermal instruction appended to said instruction and keeps a running sum of heat being generated by a current instruction stream
wherein said thermal execution unit comprises a multiplier and an adder,
wherein on every instruction cycle, in said thermal execution unit, said multiplier multiplies N bits of said thermal instruction with N entries of a thermal table to produce a product, and said adder adds said product to a running sum of a thermal meter of said thermal execution unit, and
wherein said thermal execution unit comprises a thermal meter per execution unit.

22. A programmable storage medium tangibly embodying a program of machine-readable instructions executable by a digital processing apparatus to perform a method of estimating dissipation of heat in an electrical circuit, said instructions to be processed in a microprocessor and comprising:
an existing instruction for execution by said microprocessor, said microprocessor comprising an execution unit and a thermal and a thermal execution unit; and
a thermal instruction appended to said existing instruction indicating an amount of heat generated by at least one execution unit to be invoked by said existing instruction,
wherein said method comprises:
using said thermal instruction appended to said existing instruction to determine a heat load associated with said instruction; and
multiplying, at an instruction rate, a value of the heat load generated by an instruction, by a value representing an occurrence of said instruction to obtain a product, and adding the product to a running sum of heat generated previously wherein the thermal execution unit decodes said thermal instruction appended to said instruction and keeps a running sum of heat being generated by a current instruction stream,
wherein said thermal execution unit comprises a multiplier and an adder,
wherein on every instruction cycle, in said thermal execution unit, said multiplier multiplies N bits of said thermal instruction with N entries of a thermal table to produce a product, and said adder adds said product to a running sum of a thermal meter of said thermal execution unit, and
wherein said thermal execution unit comprises a thermal meter per execution unit.

23. The instruction of claim 22, wherein a bit is provided in said thermal instruction for each execution unit of said at least one execution unit to be invoked by said existing instruction.

24. A programmable storage medium tangibly embodying a program of machine-readable instructions executable by a digital processing apparatus to perform a method of estimating dissipation of heat in an electrical circuit, said instructions to be processed in a microprocessor including an execution unit and a thermal execution unit and comprising:
an existing instruction for execution by said microprocessor; and
a thermal instruction appended to said existing instruction indicating an address for indexing a lookup table holding an entry indicating an amount of heat generated by at least one executing unit to be invoked by said existing instruction,
wherein said method comprises:
using said thermal instruction appended to said existing instruction to determine a heat load associated with said instruction; and
multiplying, at an instruction rate, a value of the heat load generated by an instruction, by a value representing an occurrence of said instruction to obtain a product, and adding the product to a running sum of heat generated previously wherein the thermal execution unit decodes said thermal instruction appended to said instruction and keeps a running sum of heat being generated by a current instruction stream,
wherein said thermal execution unit comprises a multiplier and an adder,
wherein on every instruction cycle, in said thermal execution unit, said multiplier multiplies N bits of said thermal instruction with N entries of a thermal table to produce a product, and said adder adds said product to a running sum of a thermal meter of said thermal execution unit, and
wherein said thermal execution unit comprises a thermal meter per execution unit.

25. A method of estimating dissipation of thermal energy in a microprocessor including an execution unit and a thermal execution unit, comprising:
judging an instruction stream to be processed in said microprocessor; and
determining, based on said instruction stream, an amount of heat which will be generated by processing said instruction stream,
wherein said determining comprises:
using a thermal instruction appended to an existing instruction to determine a heat load associated with said instruction; and
multiplying, at an instruction rate, a value of the heat load generated by an instruction, by a value representing an occurrence of said instruction to obtain a product, and adding the product to a running sum of heat generated previously wherein the thermal execution unit decodes said thermal instruction appended to said instruction and keeps a running sum of heat being generated by a current instruction stream,
wherein said thermal execution unit comprises a multiplier and an adder,
wherein on every instruction cycle, in said thermal execution unit, said multiplier multiplies N bits of said thermal instruction with N entries of a thermal table to produce a product, and said adder adds said product to a running sum of a thermal meter of said thermal execution unit, and wherein said thermal execution unit comprises a thermal meter per execution unit.

26. A signal-bearing storage medium tangibly embodying a program of machine-readable instructions executable by a digital processing apparatus to perform a method of estimating heat in an electrical circuit comprising a microprocessor which includes an execution unit and a thermal execution unit, said method, comprising:

using a thermal instruction appended to an instruction to be processed to determine a heat load associated with said instruction; and multiplying, at an instruction rate, a value of the heat load generated by an instruction, by a value representing an occurrence of said instruction to obtain a product, and adding the product to a running sum of heat generated previously wherein the thermal execution unit decodes said thermal instruction appended to said instruction and keeps a running sum of heat being generated by a current instruction stream, wherein said thermal execution unit comprises a multiplier and an adder, wherein on every instruction cycle, in said thermal execution unit, said multiplier multiplies N bits of said thermal instruction with N entries of a thermal table to produce a product, and said adder adds said product to a running sum of a thermal meter of said thermal execution unit, and wherein said thermal execution unit comprises a thermal meter per execution unit.

27. A microprocessor, comprising:

an execution unit that executes an instruction, said instruction including a thermal instruction appended thereto from which a heat load associated with said instruction is measurable; and a thermal execution unit running at an instruction rate, having a modifiable thermal table and a plurality of thermal meters, wherein said thermal execution unit comprises a multiplier and an adder, wherein on every instruction cycle in said thermal instruction unit, said multiplier multiplies N bits of said thermal instruction with N entries of a thermal table to produce a product, and said adder adds said product to a running sum of the thermal meter of said thermal execution unit, wherein said thermal execution unit comprises a thermal meter per execution unit, and wherein the thermal execution decodes said thermal instruction appended to said instruction and keeps a running sum of heat being generated by a current instruction stream.

* * * * *